(12) United States Patent
Dillon

(10) Patent No.: US 12,348,833 B2
(45) Date of Patent: Jul. 1, 2025

(54) SECURE SATELLITE-BASED CONTENT PRELOADING

(71) Applicant: Hughes Network Systems, LLC, Germantown, MD (US)

(72) Inventor: Douglas M. Dillon, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 612 days.

(21) Appl. No.: 17/566,358

(22) Filed: Dec. 30, 2021

(65) Prior Publication Data

US 2023/0217083 A1 Jul. 6, 2023

(51) Int. Cl.
*H04N 21/61* (2011.01)
*H04N 21/234* (2011.01)

(52) U.S. Cl.
CPC ... *H04N 21/6143* (2013.01); *H04N 21/23424* (2013.01)

(58) Field of Classification Search
None
See application file for complete search history.

(56) References Cited

U.S. PATENT DOCUMENTS

| | | | |
|---|---|---|---|
| 8,458,742 B2 * | 6/2013 | Parker | H04N 21/63345 725/24 |
| 8,745,689 B2 * | 6/2014 | Cooper | H04N 21/426 725/38 |
| 9,680,500 B2 | 6/2017 | Bhaskar et al. | |
| 10,277,716 B2 | 4/2019 | Bhaskar et al. | |
| 10,567,458 B2 | 2/2020 | Bhaskar et al. | |
| 10,575,029 B1 * | 2/2020 | Lai | H04N 21/2223 |
| 10,708,194 B2 | 6/2020 | Dillion et al. | |

(Continued)

FOREIGN PATENT DOCUMENTS

WO 2017/151738 A1 9/2017

OTHER PUBLICATIONS

International Search Report and Written Opinion for PCT/US2022/053318 mailed May 4, 2023, all pages.

(Continued)

*Primary Examiner* — Mushfikh I Alam
(74) *Attorney, Agent, or Firm* — Kilpatrick Townsend & Stockton LLP

(57) ABSTRACT

A content protection system for satellite-based content delivery is provided, including a satellite content receiver. The satellite content receiver may include one or more processors and a non-transitory processor readable medium, and be in communication with a satellite antenna. The satellite content receiver may receive a first portion of streaming media content, transmitted by a content security host system using multicast communication. The first portion of the streaming media content may be stored, and later accessed in response to a user command. A second portion of the streaming media content including data missing from the first portion of the streaming media content may be identified. The second portion may be requested from the content security host system and received by the satellite content receiver. The first and second portions of the streaming media content may be combined to reconstruct the streaming media content, which may then be output.

20 Claims, 5 Drawing Sheets

(56) References Cited

U.S. PATENT DOCUMENTS

| | | | | |
|---|---|---|---|---|
| 2006/0050785 | A1* | 3/2006 | Watanabe | H04N 19/12 348/E7.071 |
| 2008/0263611 | A1* | 10/2008 | Lecomte | H04N 21/47202 348/E7.071 |
| 2010/0103950 | A1* | 4/2010 | Statelov | H04N 21/23655 370/468 |
| 2010/0293583 | A1* | 11/2010 | Loebig | H04N 21/4147 705/400 |
| 2012/0301108 | A1* | 11/2012 | Zetterower | H04N 21/8455 386/241 |
| 2012/0324036 | A1 | 12/2012 | Chatterjee et al. | |
| 2013/0018932 | A1 | 1/2013 | Bhaskar et al. | |
| 2013/0294743 | A1* | 11/2013 | Thornberry | G11B 27/034 386/E9.011 |
| 2014/0331260 | A1* | 11/2014 | Gratton | H04N 21/482 725/40 |
| 2016/0191954 | A1* | 6/2016 | Ekstrom | H04N 21/63345 380/201 |
| 2017/0019439 | A1 | 1/2017 | Kim et al. | |
| 2018/0255338 | A1* | 9/2018 | Ross | H04N 21/44209 |
| 2019/0320238 | A1* | 10/2019 | Cavanaugh | H04N 21/466 |
| 2020/0059683 | A1* | 2/2020 | Grigsby | H04N 21/6408 |
| 2023/0026376 | A1* | 1/2023 | Martin | H04N 21/436 |
| 2023/0300426 | A1* | 9/2023 | Atluru | H04N 21/44016 725/146 |

OTHER PUBLICATIONS

Felix Wuy S et al.: "Run-time Performance Evaluation for a Secure MPEG System Supporting Both Selective Watermarking and Encryption," Internet Citation, Mar. 1, 1997, pp. 1-29, XP007921691, Retrieved from the Internet: URL: http://citeseerx.ist.psu.edu/viewdoc/download?doi=10.1.1.50.6139&rep=rep1&type=pdf p. 1-14, paragraph [0020]-paragraph [0021].

* cited by examiner

SECURE SATELLITE-BASED CONTENT PRELOADING

BACKGROUND

Providing streaming media content to consumers via satellite communication (such as satellite-based internet connections) presents problems such as bandwidth utilization and content security. If too many end user terminals request data at the same time, a satellite communication system may not have the bandwidth necessary to provide content to all the end user terminals with acceptable performance. However, preloading content on client-side devices risks unauthorized access to the preloaded content.

SUMMARY

In an embodiment, a content protection system for satellite-based content delivery is provided. The content protection system may include a satellite content receiver. The satellite content receiver may include one or more processors and a non-transitory processor readable medium, and be in communication with a satellite antenna. The processors may be configured to receive a first portion of streaming media content via the satellite antenna, transmitted by a content security host system using multicast communication. The one or more processors may also be configured to store the first portion of the streaming media content at the non-transitory processor readable medium, and access the first portion in response to a user command. The processors may identify a second portion of the streaming media content, where the second portion includes data missing from the first portion of the streaming media content. The processors may be configured to cause a request to be transmitted via unicast communication that requests the second portion of the streaming media content from the content security host system, and receive the second portion from the content security host system in response to the request. The processors may be configured to combine the first and second portions of the streaming media content to reconstruct the streaming media content for output, then output the reconstructed streaming media content.

In some embodiments, the system for satellite-based content delivery may include a client device configured to display the reconstructed streaming media content. The system for satellite-based content delivery may be a software component such as a browser plug-in, run by a client device and configured to identify the second portion of the streaming media content. The software component may be a virtual machine.

In some embodiments, the satellite content receiver may be configured to send a request to the content security host system for unmodified web content. The satellite content receiver may then receiver the unmodified web content via unicast communication and output the unmodified web content. The unmodified web content may be a second portion of streaming media content. The satellite content receiver may be configured to be a certificate authority and generate a plurality of certificates for use on public networks. In some embodiments, the certificates use a Secure Sockets Layer/transport Sockets Layer protocol.

In some embodiments, the second portion of the streaming media content includes a percentage of the streaming media content in a range 0.1% to 5%, inclusive. The second portion may include data lost during transmission of the first portion of the streaming media content.

In an embodiment, a method for protecting streaming media content over satellite-based communication is disclosed. The method may include receiving a first portion streaming media content, transmitted by a content security host system, by a satellite content receiver, where the satellite content receiver includes one or more processors and a non-transitory processor-readable medium. The method may include storing the first portion of streaming media content at the non-transitory processor-readable medium, and accessing the streaming media content by the satellite content receiver in response to a user command. The method may also include the satellite content receiver identifying a second portion of the streaming media content, where the second portion includes data missing from the first portion. The method may also include sending a request, by the satellite content receiver to the content security host system, a request for that causes the second portion to be transmitted to the satellite content receiver via unicast communication. The method may include receiving, by the satellite content receiver, the second portion of the streaming media content and combining the first and second portions to reconstruct the streaming media content for output. The method may also include outputting, by the satellite content receiver, the streaming media content.

In some embodiments, the first portion of the streaming media content may be transmitted using long-range compression. The first portion may be encrypted, using a cryptographic key, by the content security host system before the first portion is transmitted by multicast communication. The content security host system may maintain a record of the cryptographic keys. The first portion of the streaming media content may include a Uniform Resource Locator, characterized by a location of missing data. The second portion may include the missing data.

In some embodiments, accessing the first portion may include receiving a storage location of compressed data stored at the non-transitory processor readable medium, and decompressing the compressed data to access the first portion of the streaming media content. Accessing the first portion may also include sending a request, causing the content security host system to send a cryptographic key identified in the record of cryptographic keys used to encrypt the first portion to the satellite content receiver. The satellite content receiver may the decrypt the first portion of the streaming media content.

In some embodiments, the second portion of the streaming media content may include data selected at random from the streaming media content. The second portion may include data selected according to a predetermined scheme from the streaming media content. The second portion of the streaming media content, received by the satellite content receiver may not be compressed.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
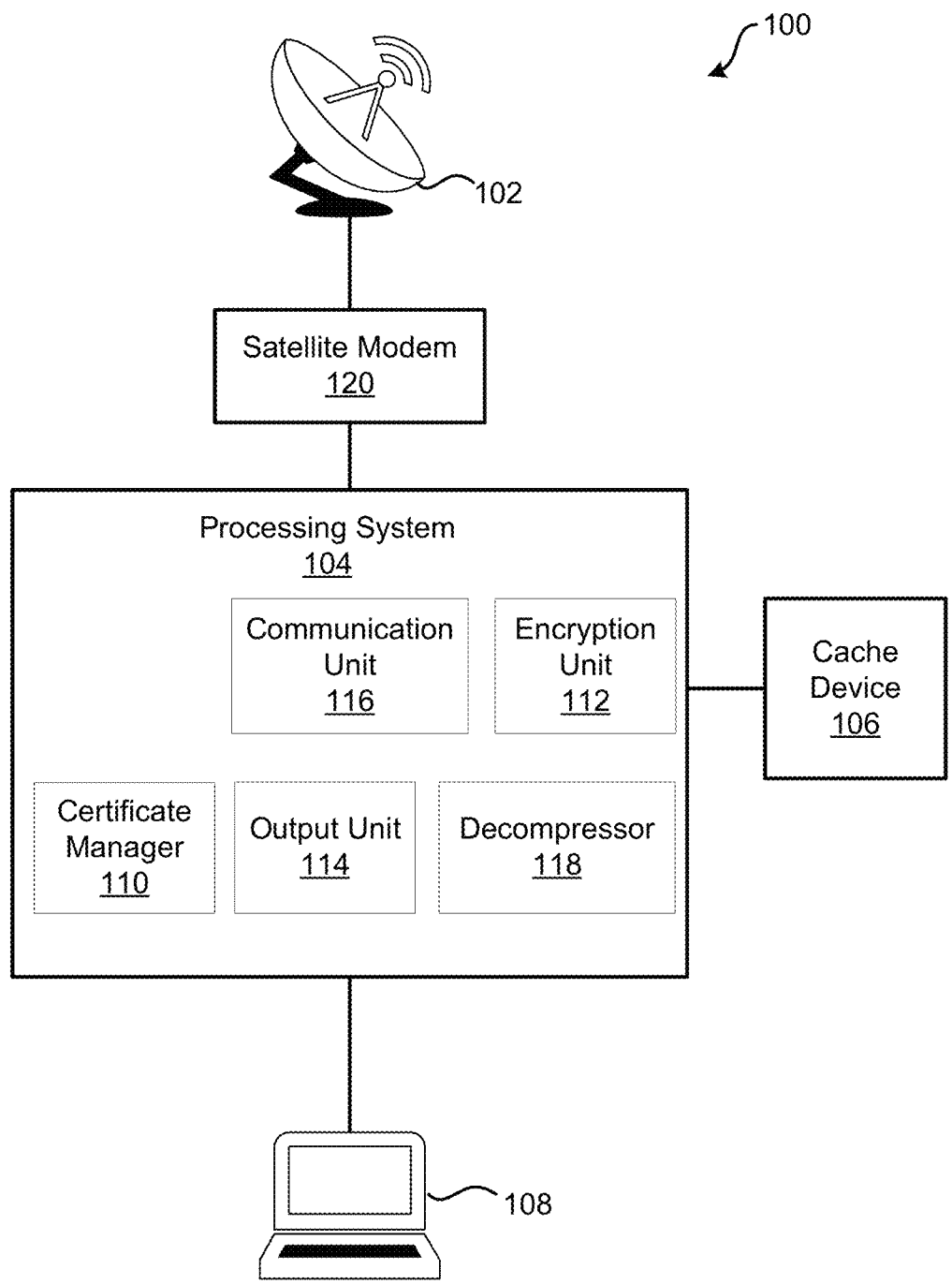
FIG. 1 illustrates an embodiment of a satellite receiver system and client device.

As streaming media grows in popularity, issues with content security and bandwidth utilization arise. These problems may be more pronounced when streaming media content is delivered over a network such as a satellite-based communication network. Multiple satellite-based communication network end user terminals may request the same streaming media content. The more end user terminals that request the streaming media content, the more bandwidth must be used to separately transmit the content across the satellite-based communication network. This may result in high bandwidth requirements that affect the performance experienced by the end user terminals that requested the streaming media content.

One solution to the bandwidth problems may be to preload a satellite content receiver with streaming media content. The streaming media content may be encrypted and stored by the satellite content receiver. However, this may raise security concerns. Content providers, for example, may be concerned about unauthorized access of the streaming media content and the decryption thereof. Thus, just preloading the streaming media content on a satellite content receiver may not provide a sufficient solution to the bandwidth and security concerns associated with distributing streaming media content over a satellite-based communication network.

To address bandwidth concerns, security concerns, or both associated with distributing streaming media content over a satellite-based communication network, a portion of the streaming media content may be preloaded on the satellite content receiver. The portion of streaming media content may be missing intermittent or periodic chunks of data, rendering the streaming media content incomplete. Thus, if an unauthorized user accesses the preloaded portion of the content and decrypts the incomplete preloaded streaming media content, the result may be unusable.

The chunks of data may be selected according to a specific video encoding standard. For example, the streaming media content may be encoded using MPEG encoding. In MPEG encoding, entire frames of a video are only refreshed when a specified threshold is met. Frames associated with an entire refresh are called "I-frames." If the threshold is not met, only portions of a frame that differ from the frame directly before it may be refreshed. These frames are called "P-frames." Other frames may include portions of a preceding frame and a following frame. These frames are called "B-frames." Because I-frames contain data constituting a total refresh of a frame, removing I-frames from streaming media content may render the content unusable. Thus, the chunks of data missing chunks of data in the systems disclosed herein may be associated I-frames. For instance, the chunks of data may be every other I-frame, every third I-frame, or any other selection of I-frames from the streaming media content.

The chunks of data needed to complete the preloaded streaming media content may be stored on a content security host system. Upon receiving a request for the streaming media content by a user, the satellite content receiver may send one or more requests for the missing chunks of data to the content security host system. Each of the requests may be for a chunk of data missing from the preloaded portion of the streaming media content and included in the missing portion. The satellite content receiver may send each request sequentially such that each chunk of data is received before a corresponding gap in the first portion of the streaming media content, and before the next chunk of data is required. The preloaded portion and the missing portion may then be combined, and the streaming media content output to the user.

The division of the streaming media content into a first portion and a second portion may take place solely in systems apart from those of a content provider. The content provider may therefore be unaware of the division, the preloading of incomplete streaming media content, or the request for the missing chunks of data. Instead, the content provider may only see a playback request from a client device. In other words, the content provider may not need to alter its systems at all in order to provide streaming media content over the satellite-based communication network.

Systems and methods described herein may utilize long-range compression techniques. In long-range compression, a previously transmitted data block may be stored in a cache. An input data block may be compared to the previously transmitted data block. If the second input data block is an exact duplicate of the first input data block, the second input data block may be compressed by a block level compressor. If only a portion of the input data block is a duplicate of the previously transmitted data block, the duplicate portion may be overwritten with a pointer to the portions of the previously transmitted data block stored in the cache. Further details are provided in U.S. Pat. Nos. 10,567,458; 9,680,500; 10,277,716; and 10,708,194 which are hereby incorporated by reference in their entirety.

FIG. 1 illustrates an embodiment of a satellite receiver system. The satellite receiver system 100 may include a satellite antenna 102 in communication with a satellite network, a satellite modem 120, a cache device 106, and a client device 108. The cache device 106 may include one or more non-transitory processor-readable mediums, such as random access memory (RAM), flash memory, a hard disk drive (HDD), or a solid state drive (SSD).

The satellite receiver system 100 may also include a processing system 104 including one or more processors. Such processors may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

The processing system 104 may also include a plurality of units 110-114, including a communication unit 116 configured to send and receive messages to satellite modem 120; a certificate manager 110, configured to operate as an Custom Certificate Authority; an encryption unit 112, configured to encrypt and decrypt data using cryptographic keys; an output unit 114 configured to prepare data for output to a client device 108; and a decompressor 118 configured to decompress data. In some embodiments, the decompressor is configured to utilize long-range compression techniques, as described in the above-referenced patents. In some embodiments, one or more of the units 110-118 shown within processing system 104 may be software components stored using one or more non-transitory processor readable mediums. In some embodiments, the non-transitory processor readable mediums may be the cache device 106. In other embodiments, the software components may be stored on a different non-transitory processor readable medium (not shown).

The client device 108 may be any type of electronic device capable of displaying data. Examples include tablets, mobile phones, personal computers, televisions configured to receive data from a network, dongles attached to televisions (such as Google Chromecast™ and/or Amazon Fire TV Stick™, or other wireless network-based device), and any other such device.

The satellite receiver system 100 may be configured to send and receive signals to and from the satellite network using the satellite modem 120 and the satellite antenna 102. In some embodiments, a first signal may include data associated with streaming media content, unmodified web content (such as a website or other web resource), or other information. The processing system 104 may cause the data included in the first signal to be stored in the cache device 106. The processing system 104 may also cause the data included in the first signal to be output to the client device 108.

In some embodiments, the first signal may include encrypted data. The data may also be compressed. The compression may include long-range compression, as referenced above. The processor may store the encrypted data in the cache device 106. The signal may also be provided via multicast communication. Upon receiving a request from the client device 108 to access the encrypted data, the processing system 104 may access the encrypted data and cause the encryption unit 112 to decrypt the encrypted data and the decompressor to decompress the encrypted data. The processing system 104 may then cause the data to be output to the client device 108 by the output unit 114. The output unit 114 may combine various portions of the streaming media content media with other portions of the streaming media content and/or with other data associated with the streaming media content. In other embodiments, the processing system 104 may cause the encrypted data to be decrypted and decompressed, then output to the client device 108 without the encrypted data being stored in the cache device 106.

The satellite receiver system 100 may receive a request from the client device 108. In response to the request, the processing system 104 may cause the satellite antenna 102 to send a request for data associated with streaming media content, unmodified web content (such as a website or other web resource), or other information. In some embodiments, the processing system 104 may receive a signal through the satellite network that includes a pointer to encrypted data located on cache device 106. In other embodiments, the processing system 104 may have a record of data stored on the cache device 106. Using the pointer and/or the record, the processing system 104 may determine that a first portion of the information requested by the client device 108 is stored at the cache device 106. In that case, the processing system 104 may cause a request for a second portion of the information requested by the client device 108 to be sent by the satellite antenna 102. In some embodiments, the processing system 104 may send the request through an alternate communication channel, such as a terrestrial network.

In some embodiments, the client device 108 may request web resources. The certificate manager 110 may be configured to generate a custom certificate authority certificate ("certificate"), including a public key and a private key. The processing system 104 may cause the certificate to be sent to the client device 108. The client device 108 may have a copy of the certificate authority certificate with its public key stored in a memory device. The client device 108 may then use the certificate authority certificate key to accept certificates generated by the certificate manager and negotiate a secure connection with the processing system 104 as if connecting with an origin content server. The secure connection may be an HTTPS connection. In some embodiments, the certificate may use a Secure Sockets Layer/Transport Sockets Layer protocol. These embodiments are discussed further below, in relation to FIG. 4.

Although the satellite receiver system 100 is shown as including separate devices in FIG. 1, other configurations are possible. For example, the processing system 104 and cache device 106 may be included in a single device. Furthermore, the cache device 106 may also be included in the client device 108.

Although the satellite receiver system 100 and is described using satellite-based communication, other configurations are considered. For example, the techniques described herein may be practiced on any suitable network. Suitable networks may include cellular networks, wired networks such as coaxial cable networks, fixed wireless networks, or other such networks capable of multicast and unicast communication. In some embodiments, multiple networks may be used. For example, a satellite receiver system 100 may receive a multicast signal (via satellite communication, a coaxial network, or any other multicast-capable network) containing data associated with streaming media content. The satellite receiver system 100 may then cause the data to be saved in the cache device 106. The client device 108 may then send a request to play the streaming media content associated with the data. The satellite receiver system 100 may then request information required to play the streaming media content via a different network (e.g., a cellular network). Furthermore, the satellite receiver system 100 may be in communication with the client device 108 through a networking system, including WiFi, local wireless networking, wired networking systems and methods, and any other networking system.

In some embodiments, one or more of the plurality of units 110-118 may be included in the client device 108. One or more of the plurality of units 110-118 may be software components and may be part of a plug-in associated with a browser stored on the client device 108. In that case, the processing system 104 may utilize one or more processors included in the client device 108. The one or more processors may execute object code associated with the browser plug in to perform one or more operations. The operations may include causing data associated with the first signal to be stored in the cache device 106, decrypting the data, decompressing the data, and causing the data to be output. In some embodiments, causing the data to be output may include displaying the data in a the browser plug-in.

Figure 2:
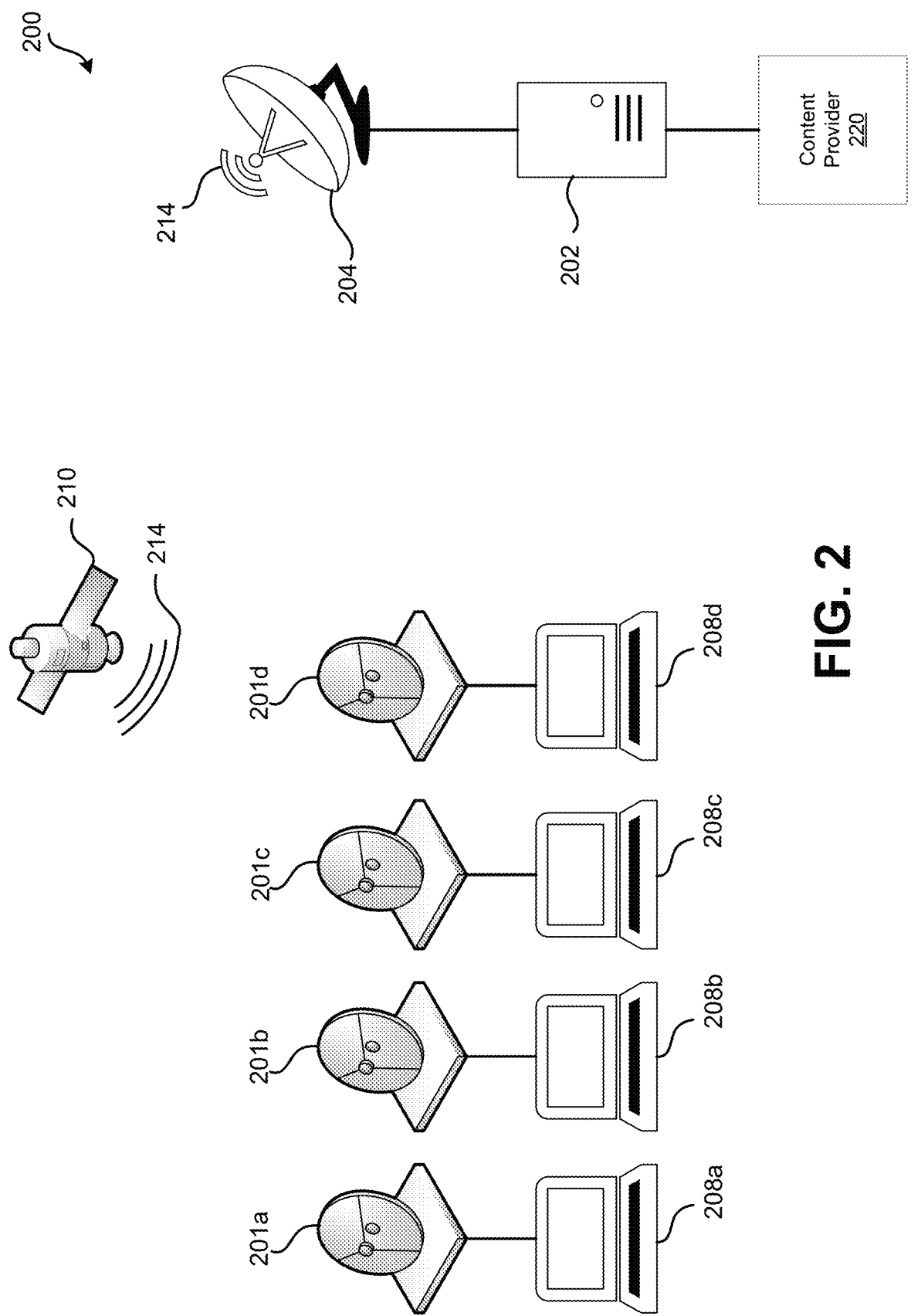
FIG. 2 illustrates an embodiment of a system for preloading content via satellite communication according to certain embodiments.

FIG. 2 illustrates an embodiment of a system for preloading content via satellite communication. The system 200 may include a content security host system 202, a main satellite antenna 204, a satellite 210, satellite content receivers 201*a-d*, and client devices 208*a-d*. The satellite content receivers 201*a*, 201*b*, 201*c*, and 201*d* may include a processing system and a cache device, such as the processing system 104 and cache device 106 in FIG. 1. While the satellite content receivers 201*a-d* are shown as being in communication with the satellite 210, it should be understood that components from FIG. 1 such as the satellite antenna 102 and the satellite modem 120 are present but not necessarily included in the satellite content receiver 201*a-d*. Additionally, the client devices 208*a*, 208*b*, 208*c*, and 208*d* may be similar to the client device 108 in FIG. 1.

The satellite content receivers 201*a-d* and the client devices 208*a-d* are shown as examples of single systems, each with an associated end user terminal and independent from each other. Also, although only four such systems are shown, any number of systems may be present in the system 200.

The content security host system 202 may include one or more processors, a memory device capable of storing data and/or executable software, and connectivity components configured to send and receive data through a network such as the internet and/or through a satellite-based communication network. The processors may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. The memory device may include one or more non-transitory processor-readable mediums, such as random access memory (RAM), flash memory, a hard disk drive (HDD), or a solid state drive (SSD). The content security host system 202 may also include an encryption unit similar to the encryption unit 112 from FIG. 1 and a compression unit configured to compress data using long-range compression, as is referenced above.

The content security host system 202 may receive streaming media content from a content provider 220. In some embodiments, the content security host system 202 may send a request for streaming media content. In other embodiments, the content security host system may receive streaming media content pushed to it from content provider 220. The content security host system 202 may compress and encrypt the streaming media content.

The content security host system 202 may select a first portion of the streaming media content and a second portion of the streaming media content. The first portion may be a majority of the streaming media content. The second portion may include chunks of data selected from the streaming media content by a predetermined scheme and excluded from the first portion. In other embodiments, the second portion may include chunks of data selected from the streaming media content at random and excluded from the first portion. The second portion of the streaming media content may include a percentage of the streaming media content within a range of 0.1% to 5%, inclusive.

The content security host system 202 may create a record of the location of chunks of data, in reference to their location within the streaming media content, as well as a record of the first portion of the streaming media content. The record may be created in accordance with long-range compression techniques. The content security host system 202 may then cause a multicast communication 214 to be sent to the satellite content receivers 201*a-d*, routing the signal through the main satellite antenna 204 and the satellite 210. The multicast communication 214 may include the first portion of the streaming media content and/or the record.

The multicast communication 214 may be received by each of the satellite content receivers 201*a-d*. The satellite content receivers 201*a-d* may then store the first portion of the streaming media content in a cache device, similar to the cache device 106 in FIG. 1. In some embodiments, the satellite content receivers 201*a-d* may decompress the streaming media content before storing the streaming media content. In other embodiments, the streaming media content may be stored compressed. In either case, the streaming media content may be stored as encrypted by the content security host system 202.

The satellite content receivers 201*a-d* may compare the first portion of the streaming media content against the record, as received by the multicast communication 214. The satellite content receivers 201*a-d* may create a record of any data missing due to transmission losses in a loss log. The satellite content receivers 201*a-d* may store the loss log in the cache device.

By sending the first portion of the streaming media content via multicast communication 214 to the satellite content receivers 201*a-d*, the first portion may be preloaded. This may mitigate the bandwidth issues that may arise if the client devices 208*a-d* request the streaming media content simultaneously, as at least a portion of the streaming media content is stored locally. Furthermore, because the first portion of the streaming media content is missing the chunks of data included in the second portion, any unauthorized access and decryption may not yield useable streaming media content. Thus, the security issues that arise from preloading streaming media content may also be mitigated.

Figure 3:
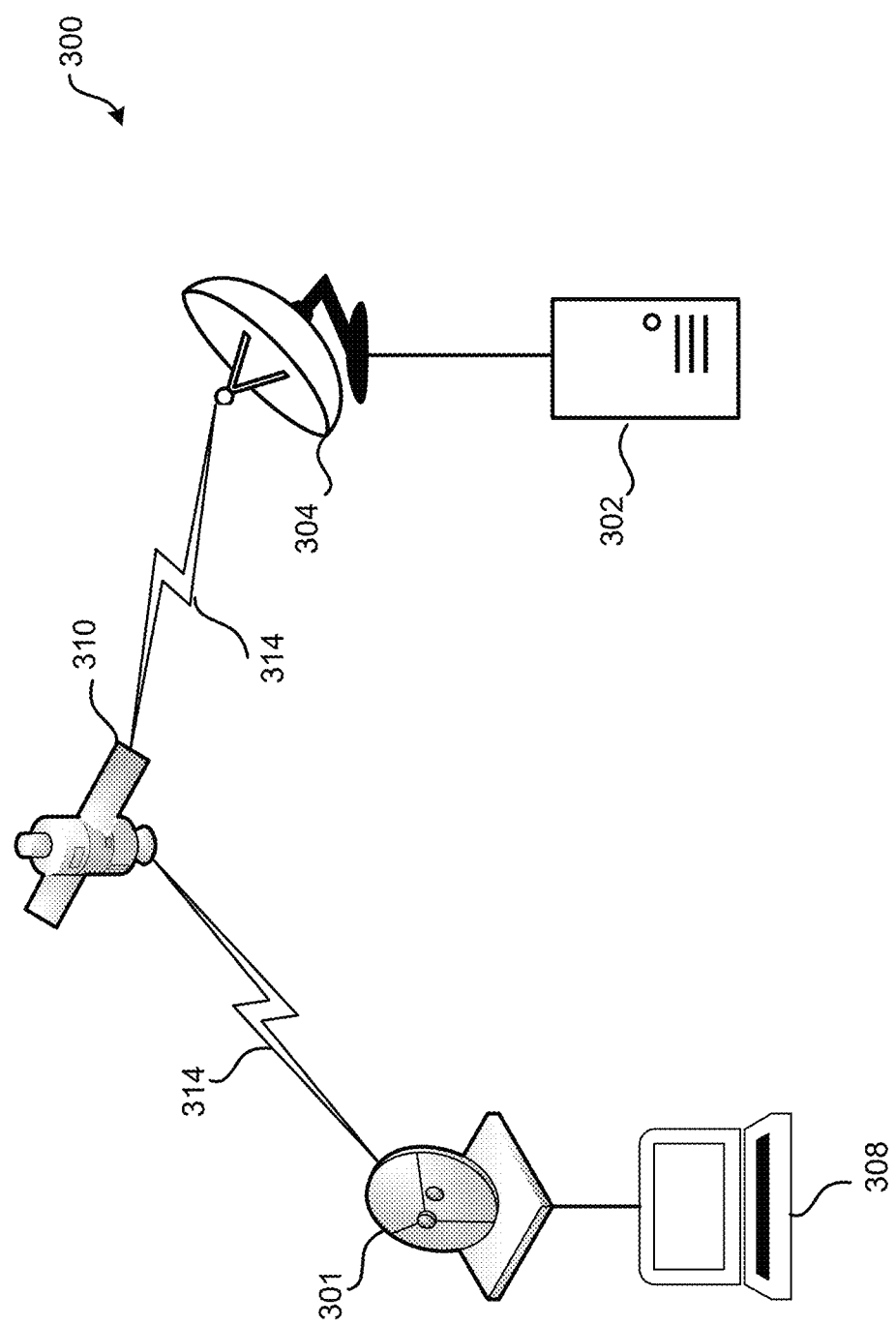
FIG. 3 illustrates an embodiment of system for accessing streaming media content.

FIG. 3 illustrates an embodiment of a system for accessing streaming media content. The system 300 may include a content security host system 302, a main antenna 304, a satellite 310, a satellite content receiver 301, and a client device 308. The content security host system 302 may be similar to the content security host system 202 in FIG. 2, and thus have a record of chunks of data not included in a first portion of streaming media content, and a second portion of streaming media content. In some embodiments, the second portion may include a percentage of the streaming media content between 0.1% and 5%, inclusive. Similarly, the satellite content receiver 301 may be one of the satellite content receivers 201*a-d* in FIG. 2 and/or the satellite receiver system 100 in FIG. 1. The satellite content receiver 301 may therefore have a preloaded first portion of the streaming media content and an associated loss log stored in a cache device similar to the cache device 106.

The satellite content receiver 301 may receive a request to access the streaming media content from the client device 308. In response to the request, the satellite content receiver 301 may access the preloaded first portion of the streaming media content. The satellite content receiver 301 may also establish a unicast communication 314 to the content security host system 302. The unicast communication 314 may include a request for the second portion of the streaming media content, stored on content security host system 302. The unicast communication 314 may also include a request for the data missing as noted in the loss log. In some embodiments, the unicast communication 314 may use a secure connection, utilizing a protocol such as HTTPS.

In response to the request, the content security host system 302 may access the second portion of the streaming media content and any data requested in the loss log. The content security host system 302 may then include the data from the loss log in the second portion of the streaming media content send the second portion through the main antenna 304 and the satellite 310 to the satellite content receiver 301 via the unicast communication 314.

In some embodiments, the satellite content receiver may pass the request to access the streaming media content to the content security host system 302. The content security host system 302 may pass the request to access the streaming media content to an associated content provider. The content security host system 302 may then receive the entire streaming media content from the content provider. Using long-range compression techniques, the content security host system 302 may determine that only the second portion of the streaming media content was not included in the pre-loaded first portion of the streaming media content. The content security host system 302 may then only send the second portion of the streaming media content and send references for the first portion of the streaming media content to the satellite content receiver 301. In this embodiment the second portion of the streaming media content may be uncompressed. The second portion of the streaming media content may be smaller than the first portion of the streaming media content.

In other embodiments, the satellite content receiver 301 may send multiple requests for the second portion of the streaming media content to the content security host system 302. Each of the requests may be for a chunk of data missing from the first portion of the streaming media content and included in the second portion. The satellite content receiver 301 may send each request sequentially such that each chunk of data is received before a corresponding gap in the first portion of the streaming media content, and before the next chunk of data is required. In response to the multiple requests, the content security host system 302 may send the second portion of the streaming media content to the satellite content receiver 301 via unicast communication. In some embodiments, the second portion of the streaming media content may be uncompressed.

The satellite content receiver 301 may combine the first portion of the streaming media content and the second portion of the streaming media content to reconstruct the streaming media content for output. In some embodiments, the first portion of the streaming media content may be decompressed by the satellite content receiver 301 prior to being combined with the second portion. In other embodiments, the second portion of the streaming media content may be combined with the first portion as it is being decompressed. The reconstructed streaming media content may then be output to the client device 308.

The systems 200 and 300 may be included in one system, discussed below in reference to FIG. 3. The system 300 effectively preloads streaming media content in a secure manner while mitigating performance and security issues. Because the first portion of the streaming media content is much larger than the second portion (within a range of 99.9% and 95% of the streaming media content), bandwidth concerns are alleviated. Even if several end user terminals request the same data from the content security host system 202 at the same time, the second portion of the streaming media content may be sent with minimal bandwidth. Thus, the satellite-based communication network may have sufficient capacity to handle all requests. Furthermore, because the satellite content receiver has a majority of the content preloaded, the client device 308 may experience mitigated performance issues.

Figure 4:
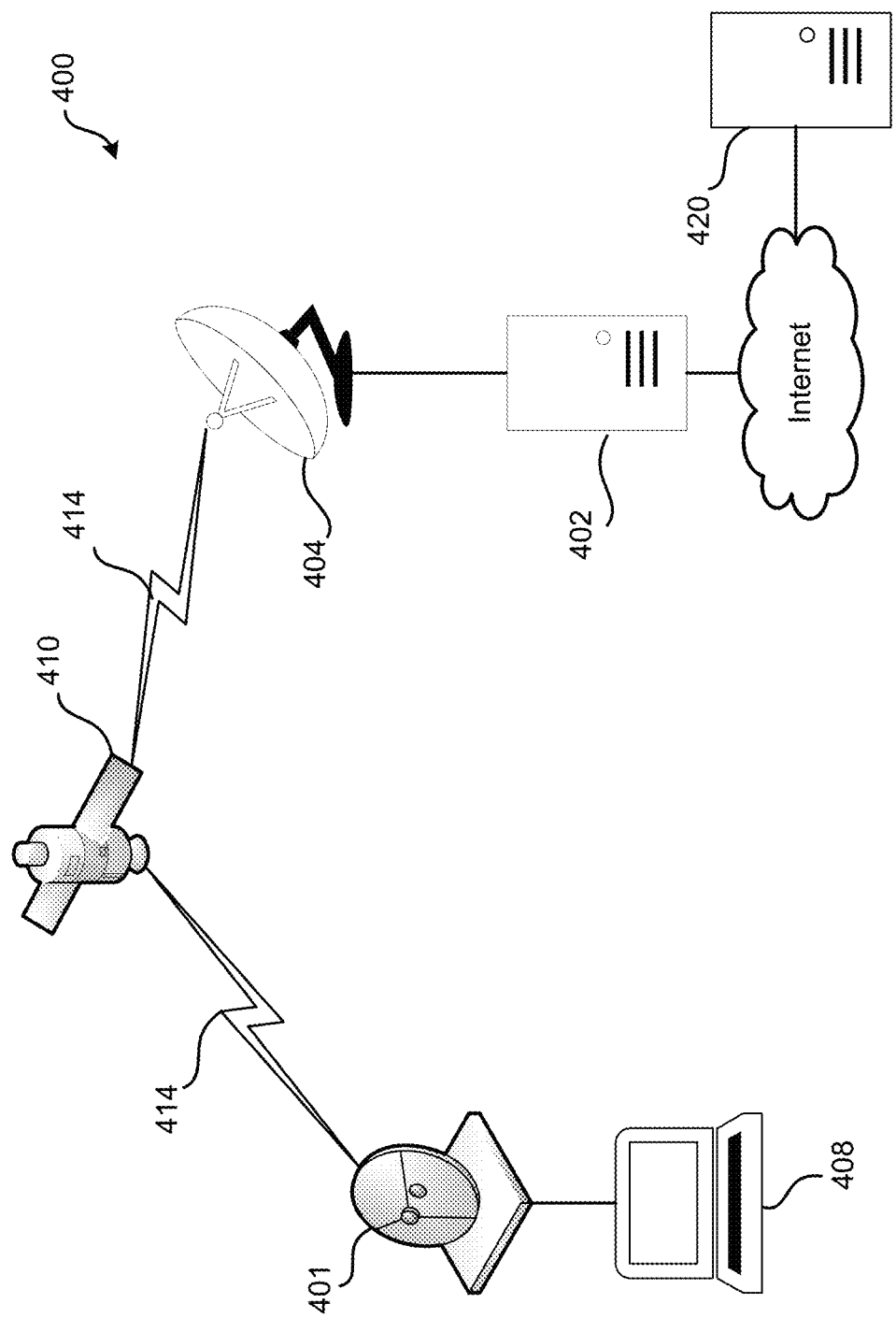
FIG. 4 illustrates an embodiment of a system for providing a secure connection to access web data.

FIG. 4 illustrates an embodiment of a system for providing a secure connection to access web. The system 400 may include a content security host system 402, a main antenna 404, a satellite 410, a satellite content receiver 401, and a client device 408. The content security host system may be similar to the content security host system 302 in FIG. 3. Also, the satellite content receiver 401 may be the same as the satellite receiver system 100 in FIG. 1 and/or the satellite content receiver 301 in FIG. 3. As such, the satellite content receiver 401 may include the same components as those of the satellite receiver system 100, such as the processing system 104 and the certificate manager 110, although neither are pictured here.

The client device 408 may establish a connection through the internet to a secure server 420. In some embodiments, the secure server 420 or the client device 408 may require a secure connection, such as HTTPS. After establishing the secure connection, the satellite content receiver 401 may intercept the secure connection. Using a certificate manager (similar to the certificate manager 110), the satellite content receiver may provide a certificate (including a public key) and a private key to the client device 408. The client device 408 may have a copy of the public key stored in a memory device. The client device 408 may use the copy to accept the certificate and negotiate a session key with the satellite content receiver 401 establishing a secure session.

The satellite content receiver 401 may then establish a unicast communication 414 with the content security host system 402, through the satellite 410 and the main antenna 404. In some embodiments, the unicast communication 414 may create a secure connection between the satellite content receiver 401 and the content security host system 402. The secure connection may utilize Secure Socket Layer (SSL)/Transport Socket Layer (TSL) protocols.

Via the unicast communication 414, the satellite content receiver 401 may then send a request to the content security host system 402 to establish a connection with the secure server 420. In response to the request, the content security host system 402 may establish a secure connection to the secure server 420, utilizing SSL/TSL protocols. In response to requests from the client device 408, the content security host system 402 may access data hosted on, interact with, or perform other operations involving the secure server 420. Because the content security host system 402 has a secure connection, the data is encrypted as sent from the secure server 420 and decrypted by the content security host system 402.

Data from the secure server 420 may then be sent back to the satellite content receiver 401 via the unicast communication 414, where the data may be sent to the client device 408. The client device 408 may only interact with the satellite content receiver 401 after establishing the initial connection with the secure server 420. Because a secure connection may be made between the satellite content receiver 401 and the content security host system 402, and another secure connection between the content security host system 402 and the secure server 420, the entire chain of connections may be secure. The satellite content receiver 401 and the content security host system 402 therefore may act as a single "man-in-the-middle" proxy server, from the perspective of the secure server 420 and the client device 408. The secure server 420 and the client device 408 may be unaware that communication is taking place through the content security host system 402 and the satellite content receiver 401. In other words, the client device 408 and the secure server 420 may be operating as if the client device 408 is in direct communication with the secure server 420, and vice versa.

In some embodiments, the secure server 420 may be associated with a content provider. The secure server 420 may send data associated with streaming media content to the content security host system 402. Using long-range compression techniques, the content security host system 402 may determine that a first portion of the streaming media content was preloaded on the satellite content receiver 401 by multicast communication. The content security host system 402 may similarly determine that a second portion of the streaming media content was not preloaded. The content security host system 402 may then only send the second portion of the streaming media content and references (location and length) for the first portion of the streaming media content to the satellite content receiver 401. The second portion of the streaming media content may be smaller than the first portion. Because of the secure session negotiated between the client device 408 and the satellite content receiver 40, and because of the secure connection between the satellite content receiver 401 and the content security host system 402, the secure server 420 may be operating as if it is in direct communication with the client device 408. The secure server 420 may not need modification, therefore, to utilize the multicast content preloading systems and techniques disclosed herein.

Each system described above may be combined in whole or in part with each of the other systems. In unison, the combined systems may form a content protection system for satellite-based content delivery. The content protection system may reduce bandwidth during high-use periods by preloading a portion of streaming media content onto a satellite content receiver, where the streaming media content is received by multicast communication. In some embodiments, the first portion may be received during off-peak times, where network traffic is low. The content protection system may also mitigate security risks to the streaming media content, as only an unusable portion of the streaming media content is stored locally. However, because a second portion of the streaming media content is small relative to the whole of the streaming media content, the content may be provided on-demand to an end user terminal without significant performance issues. Further, the content protection system may also act as a man-in-the-middle proxy server, allowing the client device regular network access across secure connections.

Figure 5:
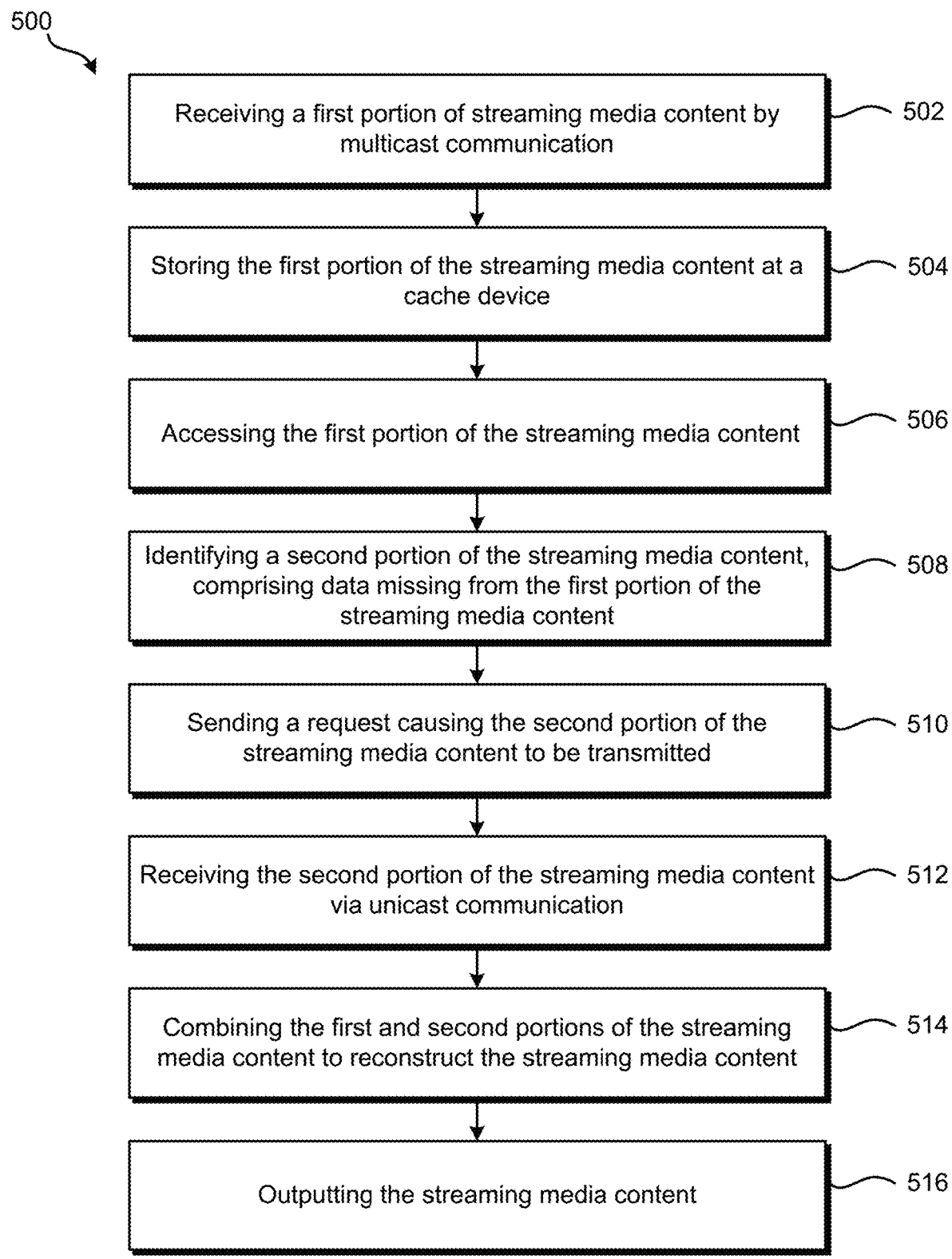
FIG. 5 illustrates an embodiment of a method for protecting streaming media content over satellite-based communication.

FIG. 5 illustrates an embodiment of a method 500 for protecting streaming media content over satellite-based communication. The method 500 may be performed in whole or in part by the satellite receiver system 100, the system 200, and the system 300, alone or in combination. At block 502, a satellite content receiver receives a first portion of streaming media content. The first portion of the streaming media content may be transmitted by a content security host system via multicast communication. In some embodiments, the first portion of the streaming media content is transmitted utilizing long-range compression. The first portion of the streaming media content may also be encrypted, using a cryptographic key, by the content security host system prior to being transmitted to the satellite content receiver. The content security host system may keep a record of cryptographic keys used to encrypt the first portion of the streaming media content. In some embodiments, the first portion of the streaming media content may include a Uniform Resource Locator associated with a location of missing data. The location of the missing data may be a location at the satellite content receiver and/or a location on the content security host system.

At block 504, the satellite content receiver stores the first portion of the streaming media content in a cache device. In some embodiments, the cache device may be a non-transitory computer readable medium. Suitable devices include a hard disk drive, solid-state drive, static or dynamic random access memory, and other such devices.

At block 506, the satellite content receiver accesses the first portion of the streaming media content in response to a user command. In some embodiments, accessing the streaming media content may include receiving a storage location of compressed data stored at the cache device and decompressing the compressed data to access the first portion of the streaming media content. In some embodiments, accessing the first portion of the streaming media content includes sending a request causing the content security host system to send a cryptographic key identified in the record of cryptographic keys used to encrypt the first portion of the streaming media content to the satellite content receiver. The first portion of the streaming media content may then be decrypted with the cryptographic key.

At block 508, the satellite content receiver may identify a second portion of the streaming media content. The second portion of the streaming media content may include data not included in the first portion of the streaming media content. In some embodiments, the second portion of the streaming media content includes chunks of data selected from the streaming media content according to a predetermined scheme. In other embodiments, the chunks of data may be selected from the streaming media content and/or may be removed at random. The second portion of the streaming media content may include 0.1%-5% of the streaming media content, inclusive.

At block 510, the satellite content receiver sends a request causing the content security host system to transmit the second portion of the streaming media content to the satellite content receiver via unicast communication. In some embodiments, the satellite content receiver sends a request for all missing chunks of data. In other embodiments, the satellite content receiver may send multiple requests for the second portion of the streaming media content to the content security host system. Each of the requests may be for a chunk of data missing from the first portion of the streaming media content and included in the second portion. The satellite content receiver may send each request sequentially such that each chunk of data is received before a corresponding gap in the first portion of the streaming media content, and before the next chunk of data is required.

At block 512, the satellite content receiver receives the second portion of the streaming media content via unicast communication. In some embodiments, the second portion of the streaming media content may include data missing from the first portion of the streaming media content due to transmission losses. In some embodiments, the second portion of the streaming media content, received by the satellite content receiver, may not be compressed.

At block 514, the satellite content receiver combines the first and second portions of the streaming media content to reconstruct the streaming media content for output. In some embodiments, the first portion of the streaming media content may be decompressed before being combined with the second portion of the streaming media content. At block 516, the satellite content receiver outputs the reconstructed streaming media content.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. In addition, features described with respect to certain configurations may be combined in various other configurations.

Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A content protection system for satellite-based content delivery, the content protection system comprising:
    a satellite content receiver, comprising one or more processors and a non-transitory processor-readable medium, that is in communication with a satellite antenna, the one or more processors being configured to:
        receive a first portion of streaming media content via the satellite antenna transmitted by a content security host system using multicast communication, wherein the first portion of the streaming media content comprises a plurality of P-frames, B-frames or both;
        store the first portion of the streaming media content at the non-transitory processor-readable medium;
        in response to a user command, access the first portion of the streaming media content for output;
        identify a second portion of the streaming media content, wherein
            the second portion of the streaming media content comprises a plurality of I-frames necessary to reconstruct the plurality of P-frames, B-frames, or both received as part of the first portion via multicast communication;
        cause a request to be transmitted to the content security host system that requests the second portion of the streaming media content via unicast communication;
        in response to the request, receive the second portion of the streaming media content from the content security host system via unicast communication;
        combine the first portion of the streaming media content and the second portion of the streaming media content to reconstruct the streaming media content for output such that the plurality of I-frames from the second portion of streaming media received via the unicast communication are used to decode the plurality of P-frames, B-frames, or both from the first portion of streaming media content received via the satellite antenna using the multicast communication; and
        output the reconstructed streaming media content.

2. The content protection system for satellite-based content delivery of claim 1 wherein the satellite content receiver comprises a client device configured to display the reconstructed streaming media content.

3. The content protection system for satellite-based content delivery of claim 1 wherein the satellite content receiver is a software component run by a client device configured to identify the second portion of the streaming media content.

4. The content protection system for satellite-based content delivery of claim 3 wherein the software component is a browser plug-in.

5. The content protection system for satellite-based content delivery of claim 1 wherein the satellite content receiver is further configured to:
    send a request to the content security host system for unmodified web content;
    receive the unmodified web content via unicast communication; and
    output the unmodified web content.

6. The content protection system for satellite-based content delivery of claim 1 wherein the second portion of the streaming media content comprises a percentage of the streaming media content in a range of 0.1% to 5%, inclusive.

7. The content protection system for satellite-based content delivery of claim 1 wherein the satellite content receiver is further configured to be a certificate authority and generate a plurality of certificates for use on public networks.

8. The content protection system for satellite-based content delivery of claim 7 wherein the plurality of certificates use a Secure Sockets Layer/Transport Sockets Layer protocol.

9. The content protection system for satellite-based delivery of claim 3, wherein the software component is a virtual machine.

10. The content protection system for satellite-based delivery of claim 1, wherein the second portion of the streaming media content comprises data lost during transmission of the first portion of the streaming media content.

11. A method for protecting streaming media content over satellite-based communication, the method comprising:
    receiving, by a satellite content receiver comprising one or more processors and a non-transitory processor-readable medium, a first portion of streaming media content transmitted by a content security host system using multicast communication, wherein the first portion of the streaming media content comprises a plurality of P-frames, B-frames or both;
    storing, by the satellite content receiver, the first portion of the streaming media content at the non-transitory processor-readable medium;

in response to a user command, accessing, by the satellite content receiver, the first portion of the streaming media content for output;

identifying, by the satellite content receiver, a second portion of the streaming media content, wherein the second portion of the streaming media content comprises a plurality of I-frames necessary to reconstruct the plurality of P-frames, B-frames, or both received as part of the first portion via multicast communication;

sending a request, by the satellite content receiver to the content security host system, that causes the second portion of the streaming media content to be transmitted to the satellite content receiver via unicast communication;

receiving, by the satellite content receiver, the second portion of the streaming media content from the content security host system via unicast communication;

combining, by the satellite content receiver, the first portion of the streaming media content and the second portion of the streaming media content to reconstruct the streaming media content for output such that the plurality of I-frames from the second portion of streaming media received via the unicast communication are used to decode the plurality of P-frames, B-frames, or both from the first portion of the streaming media content received via the multicast communication; and outputting, by the satellite content receiver, the streaming media content.

12. The method of claim 11, wherein the second portion of the streaming media content comprises data selected at random from the streaming media content.

13. The method of claim 11, wherein the second portion of the streaming media content comprises data selected according to a predetermined scheme from the streaming media content.

14. The method of claim 11, wherein the first portion of the streaming media content is transmitted utilizing long-range compression.

15. The method of claim 11, wherein accessing the first portion of the streaming media content further comprises:
receiving a storage location of compressed data stored at the non-transitory processor-readable medium; and
decompressing the compressed data to access the first portion of the streaming media content.

16. The method of claim 11, wherein the second portion of the streaming media content received by the satellite content receiver is not compressed.

17. The method of claim 11, wherein the first portion of the streaming media content is encrypted, using a cryptographic key, by the content security host system before the first portion of the streaming media content is transmitted via multicast communication.

18. The method of claim 17, wherein the content security host system maintains a record of cryptographic keys used to encrypt the first portion of the streaming media content.

19. The method of claim 18, wherein accessing the first portion of the streaming media content comprises sending a request, causing the content security host system to send the cryptographic key identified in the record of cryptographic keys used to encrypt the first portion of the streaming media content to the satellite content receiver, and decrypting the first portion of the streaming media content with the cryptographic key.

20. The method of claim 11, wherein the first portion of the streaming media content comprises a Uniform Resource Locator characterized by a location of missing data, and the second portion of the streaming media content comprises the missing data.

* * * * *